United States Patent [19]

Beall et al.

[11] Patent Number: 5,352,638
[45] Date of Patent: Oct. 4, 1994

[54] NICKEL ALUMINOSILICATE GLASS-CERAMICS

[75] Inventors: George H. Beall, Big Flats; Joseph E. Pierson, Painted Post, both of N.Y.

[73] Assignee: Corning Incorporated, Corning, N.Y.

[21] Appl. No.: 199,753

[22] Filed: Feb. 22, 1994

[51] Int. Cl.[5] ............................................. C03C 10/02
[52] U.S. Cl. ........................................ 501/10; 501/69
[58] Field of Search ............................. 501/10, 69, 71

[56] References Cited

U.S. PATENT DOCUMENTS

| | | | |
|---|---|---|---|
| 2,920,971 | 1/1960 | Stookey . | |
| 3,962,514 | 6/1976 | Rittler | 501/10 X |
| 4,059,454 | 11/1977 | Reade | 501/69 X |
| 4,198,467 | 4/1980 | Reade | 428/410 |

OTHER PUBLICATIONS

Ma, C.-B., K. Sahl, and E. Tillmanus, "Nickel Alumino-silicate, Phase I", *Acta. Cryst.*, B31, 2137-2139 (1975).

Akaogi, M., S.-I Akimoto, K. Horioka, K.-I. Takahashi, and H. Horiuchi, "The System $NiAl_2O_4-Ni_2SiO_4$ at High Pressures and Temperatures: Spinelloids with Spinel-Related Structures", *Journal of Solid State Chemistry*, 44, 257-267 (1992) no month.

*Primary Examiner*—Karl Group
*Attorney, Agent, or Firm*—C. S. Janes, Jr.

[57] ABSTRACT

This invention is directed to the production of thermally crystallizable glasses which can be crystallized in situ via heat treatment into glass-ceramic articles containing a nickel spinelloid as the predominant crystal phase. The glasses consist essentially, in weight percent, of 40–60% $SiO_2$, 10–35% $Al_2O_3$, 5–35% NiO, 0–20% MgO, and 0–15% total $TiO_2$ and/or $ZrO_2$. The preferred glasses contain at least 2% MgO.

6 Claims, No Drawings

NICKEL ALUMINOSILICATE GLASS-CERAMICS

BACKGROUND OF THE INVENTION

The field of glass-ceramics had its beginnings over 30 years ago with U.S. Pat. No. 2,920,971 (Stookey). Since that time the patent literature has recorded multitudes of glass-ceramics of widely-varying compositions for use in widely-varying applications.

Because of the difficulty of forming glasses over broad areas in the $SiO_2$—$Al_2O_3$—$NiO$ ternary system, very little, if any, experimentation has been undertaken to prepare glass-ceramic articles from compositions within that system. Recent studies of nickel spinel mineralogy and composition, however, have revealed that substantial concentrations of silica can be incorporated in nickel aluminate spinels [Ma, C.-B., K. Sahl, and E. Tillmanus, "Nickel Alumino-silicate, Phase I" Acta Cryst., B31, 2137–2139 (1975) and Akaogi, M., S.-I Akimoto, K. Horioka, K. -I. Takahashi and H. Horiuchi, "The System $NiAl_2O_4$—$Ni_2SiO_4$ at High Pressures and Temperatures: Spinelloids with Spinel-Related Structures" *Journal of Solid State Chemistry*, 44, 257–267 (1992)]. This nickel alumino-silicate is referred to as a spinelloid and is a solid solution centered near three parts $NiAl_2O_4$ and one part $Ni_2SiO_4$. This crystal phase has an x-ray diffraction pattern similar to ringwoodite; the crystallographic assignments given by Ma et al. are $[Ni_{0.5}Al_{5.2}Si_{2.3}]^{IV}[Ni_{9.8}Al_{6.2}]^{VI}O_{32}$. This nickel aluminosilicate spinelloid exhibits a predominance of nickel in the octahedral site, all silicon in the tetrahedral position, and a rough even split of aluminum in both positions.

Inasmuch as glass-ceramics containing spinels are well known in the $SiO_2$—$Al_2O_3$—$MgO$—$ZrO_2$ and $SiO_2$—$Al_2O_3$—$ZnO$—$ZrO_2$—$TiO_2$ composition systems, we investigated the possibility of precipitating spinel-type crystals in nickel alumino-silicate glasses, with the expectation that the percentage of crystallinity would be high because of the inclusion of a silica component in the system. Furthermore, although the nickel aluminosilicate composition system is poor for glass forming, the magnesium aluminosilicate composition system is well recognized as demonstrating excellent glass forming behavior. Therefore, we explored incorporation of MgO additions to the $SiO_2$—$Al_2O_3$—$NiO$ ternary, thereby producing a $SiO_2$—$Al_2$—$NiO$—$MgO$ quaternary composition system.

Spinel is a hard, dense material exhibiting a high elastic modulus. We conjectured that, if it was possible to nucleate and crystallize a nickel spinel which would combine extremely fine crystal size coupled with moderately high crystallinity, the resulting glass-ceramic bodies would be stiff, strong, and highly polishable.

SUMMARY OF THE INVENTION

We have found a new family of thermally crystallizable glasses which can be crystallized in situ to glass-ceramics combining high stiffness, high hardness, good strength and toughness, excellent thermal and chemical durability, and a very fine microstructure in the basic $SiO_2$—$Al_2O_3$—$MgO$ composition system. The broad area of operable precursor glass compositions consists essentially, expressed in terms of weight percent on the oxide basis, of 40–60% $SiO_2$, 10–35% $Al_2O_3$, 5–35% NiO, and 0–20% MgO. Whereas the inclusion of traditional nucleating agents is surprisingly not required, in certain instances they are useful in improving the surface quality of the glass-ceramic. In this vein, $TiO_2$ and/or $ZrO_2$ may be added in amounts up to 15% by weight total.

As employed here, the expression "consisting essentially of" renders the claim open only for the inclusion of unspecified ingredients not materially affecting the basic and novel characteristics of the composition. In general, the total of all such inclusions will not exceed about 5%.

As was indicated above, the glass forming area of the $SiO_2$—$Al_2O_3$—$NiO$ ternary is quite restricted. Moreover, even in the best glass forming area, fine opalization can be observed in glass articles of any substantial bulk. That presence leads to some warpage of the glass shape with consequent difficulties in maintaining its shape. In addition, the degree of opalization developed depends upon the cooling rate to which the molten glass is subjected in forming a desired shape, and the crystallization generated during heat treatment to convert the glass to a glass-ceramic is generally inhomogeneous.

Those defects are overcome when MgO in an amount of at least 2% by weight is added to the $SiO_2$—$Al_2O_3$—$NiO$ ternary. The resulting glass remains clear of opalization or devitrification and exhibits a black coloration. In thin chips the color appears as a dark brown. That color sharply distinguishes these glasses from the green opals observed in the ternary system glasses. Concentrations of MgO greater than 20% hazard devitrification of the precursor glass. The preferred levels of MgO range about 5–15%.

One of the most remarkable features of the present inventive glasses is the extremely efficient nucleation which takes place therein without the aid of a conventional nucleating agent. Each of the glasses in the simple ternary system is self-nucleating, and virtually all of the glasses in the quaternary system containing at least 5% NiO are likewise self-nucleating In fact, $Ni^{+3}$ is the only modifying ion to our knowledge which promotes nucleation over a wide range of aluminosilicate glasses. This unique effect is believed to be due to its tendency to enter both tetrahedral or network sites as well as octahedral or modifying sites. The green opalization that generally precedes crystallization in these glasses also suggests a strong partition of nickel into dispersed amorphous droplets which, upon subsequent heat treatment, are centers of crystallization. An effective nucleation temperature for the inventive glasses is about 800°–850° C., which temperature interval is about 100° C. above the annealing or transition temperatures of the glasses.

Crystallization of nickel-containing, spinel-type phases begins at about 850° C. and continues somewhat linearly as a function of increasing temperature up to about 1200° C. Total shrinkage of the glass upon crystallization at top temperatures is commonly about 5–10%, with a linear shrinkage of about 2–3%. The appearance of the glass during the crystallization process also changes remarkably. The dark brown, almost black glass changes first to dark green, then to dark aqua, and finally to an opaque turquoise. The fracture surface of the crystallized body exhibits a waxy appearance. The average size of the crystals is very small — the diameters thereof are substantially less than 0.5 $\mu$ even after a heat treatment of four hours at 1200° C.

In the simple ternary composition glasses, which typically are green opals as formed, two crystalline phases are generated in situ. The major phase has a spinel-type (spinelloid) structure exhibiting an x-ray diffraction pattern most closely resembling the high pressure spinel form of magnesium iron orthosilicate, a mineral known as ringwoodite. NiO is present as a minor secondary phase. Whereas the spinel-type phase quite obviously contains no magnesium or iron, the deviation of the crystal pattern from typical spinel patterns suggests the incorporation of silica into the crystal.

In the MgO-containing quaternary composition system, the glasses are completely amorphous, exhibiting a black or dark brown color as formed. Upon heat treatment the most common crystal developed is a single phase similar in x-ray diffraction pattern to that of nickel spinelloid at relative low temperatures, viz., about 900°-1100° C. That feature indicates a solid solution existing between magnesium and nickel spinels. That solid solution is not limitless, however, because some compositions appear to exhibit characteristic doublet or triplet peaks indicative of the coexistence of two or even three spinel phases, especially when the crystallization temperature is raised to 1200° C. Also, two phases appear to be present in some of the electron micrographs. That situation suggests that there may be incomplete solid solution under true equilibrium conditions between the spinelloid components $NiAl_2O_4$—$Ni_2SiO_4$—$MgAl_2O_4$ and $Mg_2SiO_4$.

The inventive nickel spinelloid-containing glass-ceramics are extremely fine-grained in nature, with typical crystal sizes varying from about 0.25 $\mu$m, after heat treatment at 1200° C., to sizes well below 500 Å when crystallized in situ at lower temperatures, e.g., 900°-1000° C. We are unaware of any other glass-ceramic system which yields such fine-grained crystallites when crystallized at temperatures of about 1200° C.

A typical microstructure may be monophase, i.e., containing a single spinelloid. That microstructure is common with compositions of high nickel contents and/or most glass compositions crystallized in situ at temperatures below 1100° C. Two other microstructures have been observed, however. In the first case two spinel-type crystals coexist wherein one of the spinel solid solutions, conjectured to have a higher MgO level with superior grain growth, exhibits much larger crystal dimensions, e.g., approaching 0.5-1.0 $\mu$m. In the second case a spinelloid can be accompanied by a NiO crystal.

The nickel-containing spinelloid, generally the major or sole phase, depending upon the parent composition, usually demonstrates an anhedral structure with geometric outlines resembling that of an amorphous phase. These irregular droplet-shaped crystals are thought to have had their genesis in an earlier phase separation of nickel-rich and silica-rich glasses.

The total crystallinity in the inventive glass-ceramics appears to average around 50% by volume. The composition of the residual glass has not been analyzed, but has been assumed to be rich in silica.

In summary, our invention provides a thermally crystallizable glass consisting essentially, expressed in terms of weight percent on the oxide basis, of 40-60% $SiO_2$, 10-35% $Al_2O_3$, 5-35% NiO, 0-20% MgO, and 0-15% total $TiO_2$ and/or $ZrO_2$, with the preferred glass composition containing at least 2% MgO. That glass can be crystallized in situ via heat treatment to yield a glass-ceramic article wherein a nickel spinelloid comprises the predominant, if not the sole, crystal phase. In accordance with the typical procedure for converting a precursor glass into a glass-ceramic, the method for producing our inventive glass-ceramic articles comprises the following steps:

(a) melting a batch for a glass consisting essentially, expressed in terms of weight percent on the oxide basis, of 40-60% $SiO_2$, 10-35% $Al_2O_3$, 5-35% NiO, 0-20% MgO, and 0-15% total $TiO_2$ and/or $ZrO_2$;

(b) cooling said melt to a temperature at least below the transformation range of said glass and simultaneously forming a glass body therefrom of a desired configuration;

(c) exposing said glass body to a temperature between about 800°-850° C. for a time sufficient to generate the development of nuclei therein;

(d) exposing said nucleated glass body to a temperature between about 850°-1200° C. for a time sufficient to cause the growth of nickel spinelloid crystals in situ on said nuclei to form a glass-ceramic body; and thereafter (e) cooling said glass-ceramic body to room temperature.

Description of Preferred Embodiments

Table I records a number of glass compositions, expressed in terms of parts by weight, illustrating the compositional parameters of the inventive products. Because the sum of the constituents totals or closely approximates 100, for all practical purposes the individual values reported may be deemed to represent weight percent. The actual batch ingredients may be any materials, either oxides or other compounds, which, when melted together, will be converted into the desired oxide in the proper proportions. For example, $MgCO_3$ can comprise the source of MgO.

The batch ingredients were compounded, automatically tumble mixed together, and then charged into platinum crucibles. The crucibles, generally containing batches of about 1 kg in weight, were introduced into a furnace operating at about 1600° C., and the batches melted for about 16 hours. Thereafter, the melts were poured into steel molds to produce glass slabs having dimensions of about 8"×4"×0.5" (20.32×10.16×1.27 cm), in some cases, free circular discs having a diameter of 10" (25.4 cm) and a thickness of about 0.25" (0.635 cm), which were immediately transferred to an annealer operating at about 650°-675° C.

Tab-shaped samples having dimensions of about 2.5"×1"×0.5" (6.35×2.54×0.635 cm) were cut from the glass discs and subjected to the heat treatment schedules recited in Table II. The samples were placed in an electrically heated furnace and the temperature of the furnace raised at a rate of about 300° C./hour to the temperature of nucleation. The furnace was maintained at the nucleation temperature for the period of time specified in the table, after which the temperature was raised to the crystallization temperature, the rate of temperature increase again being about 300° C./hour. After holding the furnace at that temperature for the time specified in the table, the electric current to the furnace was cut off and the furnace allowed to cool with the samples retained therewithin. This practice, termed "cooling at furnace rate", results in a cooling rate averaging about 3°-5° C./minute.

It will be appreciated that express dwell periods at specific temperatures to achieve nucleation and crystallization are not required. It is only necessary that the precursor glass article be retained within the nucleation temperature range for a time sufficient to assure good nucleation, generally for at least about one hour, followed by holding the nucleated article within the crystallization temperature range for a sufficient period of time to obtain a high degree of crystallization, that time again generally being at least about one hour. Much longer nucleation and crystallization periods may be employed, e.g., 8–12 hours, but four hours have been considered to comprise a practical maximum time.

It will be recognized that the above procedures reflect laboratory practice only. For example, the batches for the parent glasses of the inventive products can be melted in large commercial melting units and the melts formed into desired glass shapes utilizing commercial glass forming techniques and equipment. It is only necessary that the batches be heated to a temperature and for a time sufficient to assure a homogeneous melt, and the melt then cooled and simultaneously shaped at a sufficiently rapid rate to avoid the development of devitrification.

Likewise, rather than a two-step crystallization procedure with specific dwell periods, a continuous process, for example, employing a lehr or tunnel kiln, is quite feasible. Hence, as was explained above, it is only necessary that the precursor glass article be exposed to temperatures within the nucleation range for a sufficient length of time to develop nuclei therein and thereafter exposed to temperatures within the crystallization range for a sufficient length of time to cause the growth of crystals on the nuclei.

Table II also contains visual observations of the parent glass and the subsequently crystallized glass-ceramic. The crystal phases were identified via x-ray diffractometry and the microstructure of the glass-ceramics studied via replica electron microscopy. Some measurements were made of density (g/cm$^3$), abraded and unabraded modulus of rupture (Kpsi), fracture toughness expressed as $K_{IC}$ (MPa$\sqrt{m}$), hardness expressed as Knoop Hardness Number [KHN(g/mm$^2$)], and elastic modulus expressed as E(X10$^6$ psi).

TABLE I

|  | 1 | 2 | 3 | 4 | 5 | 6 | 7 | 8 | 9 |
|---|---|---|---|---|---|---|---|---|---|
| SiO$_2$ | 41 | 49 | 54 | 54 | 54 | 54 | 54 | 54 | 58 |
| Al$_2$O$_3$ | 19 | 18 | 21 | 25 | 25 | 23 | 25 | 30 | 25 |
| NiO | 40 | 33 | 15 | 13 | 17 | 17 | 15 | 8 | 21 |
| Mgo | — | — | 10 | 8 | 4 | 6 | 6 | 8 | 6 |
| ZrO$_2$ | 6 | — | 8.5 | — | — | — | — | 10 | — |

|  | 10 | 11 | 12 | 13 | 14 | 15 | 16 | 17 | 18 |
|---|---|---|---|---|---|---|---|---|---|
| SiO$_2$ | 46 | 46 | 50 | 46 | 49 | 43 | 43 | 46 | 50 |
| Al$_2$O$_3$ | 27 | 25 | 25 | 25 | 25 | 30 | 30 | 25 | 25 |
| NiO | 19 | 21 | 17 | 19 | 10 | 13 | 15 | 15 | 17 |
| Mgo | 8 | 8 | 8 | 10 | 16 | 14 | 12 | 14 | 8 |
| TiO$_2$ | — | — | — | — | — | — | — | — | 5 |

TABLE II

| Example | Glass Appearance | Heat Treatment | Glass-ceramic Appearance | Crystal Phases |
|---|---|---|---|---|
| 1 | Mottled, green, glossy edges, crystal center | 850°-2 hrs 1200°-4 hrs | Fine-grained turquoise | — |
| 2 | Green, opal | 850°-2 hrs 1200°-4 hrs | Turquoise, satin-cherty fracture, wrinkled top surface | Spinelloid, nickel oxide, glass |
| 3 | Black | 800°-2 hrs 1100°-4 hrs | Green, glassy fracture | Spinelloids, glass, baddeleyite |
| 4 | Black | 850°-4 hrs 1200°-4 hrs | Blue-green, waxy fracture | Spinelloids, glass |
| 5 | Black | 850°-4 hrs 1200°-4 hrs | Blue-green, waxy fracture, dull top surface | Spinelloid, glass |
| 6 | — | 850°-4 hrs 1200°-4 hrs | Blue-green, waxy fracture | Spinelloids/spinels, glass |
| 7 | — | 850°-4 hrs 1200°-4 hrs | Blue-green, waxy fracture | Spinelloids/spinels, glass |
| 8 | Black | 850°-4 hrs 1100°-4 hrs | Green, cherty fracture, some cracks | Spinelloid, glass |
| 9 | Black | 850°-4 hrs 1200°-4 hrs | Blue-green waxy fracture, dull top surface | Spinelloids, glass |
| 10 | Black | 850°-4 hrs 1200°-4 hrs | Blue-green, waxy fracture, dull top surface | Spinelloids, glass |
| 11 | Black | 850°-4 hrs 1200°-4 hrs | Blue-green, waxy fracture, dull top surface | Spinelloids, glass |
| 12 | Black | 850°-4 hrs 1200°-4 hrs | Blue-green, waxy fracture, dull top surface | Spinelloids, glass |
| 12 | Black | 800°-4 hrs 1000°-4 hrs | Dark green, glassy fracture | Spinelloid, glass |
| 13 | Black | 850°-4 hrs 1200°-4 hrs | Blue-green, waxy fracture, dull top surface | Spinelloids, glass |
| 14 | Black | 1200°-4 hrs | Blue-green, waxy fracture, dull top surface | Spinelloids, glass |
| 15 | — | 850°-4 hrs 1200°-4 hrs | Blue-green, waxy fracture, dull top surface | Spinelloids, glass |
| 16 | — | 850°-4 hrs 1200°-4 hrs | Turquoise, waxy fracture, dull top surface | Spinelloids, glass |
| 17 | — | 1200°-4 hrs | Turquoise, waxy fracture, dull top surface | Spinelloids, glass |
| 18 | Black | 1200°-4 hrs | Blue-green interior, cherty fracture, glossy top surface | Spinelloid, cristobalite |

| Example | Unabraded MOR | Abraded MOR | $K_{IC}$ | KHN | E | Density |
|---|---|---|---|---|---|---|
| 5 | — | — | — | — | 16.78 | 2.940 |
| 7 | 16 | 12 | 1.11 | — | — | — |
| 9 | — | — | — | 869 | 14.95 | 3.037 |
| 11 | — | — | — | — | 19.37 | 3.174 |
| 13 | — | — | — | — | 19.91 | 3.174 |
| 15 | — | — | — | — | 21.22 | 3.13 |
| 16 | — | — | — | — | 20.67 | 3.132 |
| 17 | — | — | — | — | 21.20 | 3.182 |

As noted above, two of the most interesting properties of the inventive glass-ceramics are their very fine-grained microstructure, which results in excellent smoothness on both polished and fractured surfaces, and their very high elastic moduli.

To illustrate, utilizing the atomic force microscopy (AFM) measuring technique, an Ra (surface roughness) average of 24.0 Å was determined on polished surfaces of Example 4. The peak-to-valley distance measured by AFM averaged 180 Å. A comparison with a polished surface of a glass-ceramic containing canasite as the predominant crystal phase, such as is disclosed in U.S. Pat. No. 4,386,162, showed that the roughness of the inventive glass-ceramic was only about 10% of that of the canasite-containing glass-ceramic.

The elastic moduli measured on the inventive glass-ceramics ranged from about 15-21 million psi, the latter value being far higher than any other glass-derived material to our knowledge. Furthermore, the inventive products exhibit the capability of taking on very fine polished surfaces such as can be produced in glass or extremely fine-grained glass-ceramics. The inventive glass-ceramics can have crystals with sizes below 50 nm and the crystal size can be closely controlled. In addition, many of the inventive glass-ceramics contain but a single crystal phase and glass; most of the inventive products will if heat treated at temperatures of 1100° C. and lower. Such a combination results in a body of unsurpassed, controllable fine surface texture.

Based upon an overall balance of melting and forming capability, coupled with the most advantageous matrix of physical properties, Example 12 is deemed to represent the best embodiment of the invention.

We claim:

1. A glass-ceramic article containing a nickel spinelloid as the predominant crystal phase, said glass-ceramic article consisting essentially, expressed in terms of weight percent on the oxide basis, of 40-60% $SiO_2$, 10-35% $Al_2O_3$, 5-35% NiO, 0-20% MgO, and 0-15% total $TiO_2$ and/or $ZrO_2$.

2. A glass-ceramic article according to claim 1 containing at least 2% MgO.

3. A glass-ceramic article according to claim 2 containing 5-15% MgO.

4. A method for making a glass-ceramic article containing a nickel spinelloid as the predominant crystal phase comprising the steps of:
   (a) melting a batch for a glass consisting essentially, expressed in terms of weight percent on the oxide basis, of 40-60% $SiO_2$, 10-35% $Al_2O_3$, 5-35% NiO, 0-20% MgO, and 0-15% total $TiO_2$ and/or $ZrO_2$;
   (b) cooling said melt to a temperature at least below the transformation range of said glass and simultaneously forming a glass body therefrom of a desired configuration;
   (c) exposing said glass body to a temperature between about 800°-850° C. for a time sufficient to generate the development of nuclei therein;
   (d) exposing said nucleated glass body to a temperature between about 850°-1200° C. for a time sufficient to cause the growth of nickel spinelloid crystals in situ on said nuclei to form a glass-ceramic body; and thereafter
   (e) cooling said glass-ceramic body to room temperature.

5. A method according to claim 4 wherein said glass contains at least 2% MgO.

6. A method according to claim 5 wherein said glass contains 5-15% MgO.

* * * * *